United States Patent [19]
Kawai et al.

[11] Patent Number: 5,801,305
[45] Date of Patent: Sep. 1, 1998

[54] METHOD AND APPARATUS FOR DETECTING A TIRE INFLATION PRESSURE

[75] Inventors: Hiroaki Kawai, Anjo; Katsu Hattori, Nagoya, both of Japan

[73] Assignee: Aisin Seiki Kabushiki Kaisha, Kariya, Japan

[21] Appl. No.: 738,809

[22] Filed: Oct. 28, 1996

[30] Foreign Application Priority Data

Oct. 31, 1995 [JP] Japan ................................ 7-308183

[51] Int. Cl.$^6$ .......................... B60C 23/00; B60C 23/02
[52] U.S. Cl. ................................. 73/146.2; 340/448
[58] Field of Search ........................... 73/146, 146.1, 73/146.5, 146.8; 340/445, 448

[56] References Cited

U.S. PATENT DOCUMENTS

| | | | |
|---|---|---|---|
| 4,898,431 | 2/1990 | Karnopp et al. | |
| 5,172,318 | 12/1992 | Meissner et al. | |
| 5,436,447 | 7/1995 | Shew | 250/291 |
| 5,497,657 | 3/1996 | Taguchi et al. | 73/146.2 |
| 5,606,122 | 2/1997 | Taguchi et al. | 73/146.2 |
| 5,619,998 | 4/1997 | Abdel-Malek et al. | 600/437 |
| 5,661,822 | 8/1997 | Knowles et al. | 382/233 |

FOREIGN PATENT DOCUMENTS

| | | | |
|---|---|---|---|
| 0 578 826 A1 | 1/1994 | European Pat. Off. | 73/146.2 |
| 4-275685 | 10/1992 | Japan . | |
| 5-133831 | 5/1993 | Japan . | |

OTHER PUBLICATIONS

Graps, Amara, "An Introduction to Wavelets", reproduced from IEEE Computational Science and Engineering, Summer 1995, vol. 2, No. 2. Downloaded from the Internet at http://www.amara.com/IEEEwave/IEEEwavelet.html.

Umeno et al., "Estimation of Parameter Variation based on the Disturbance Observer", T. IEE Japan, vol. 114-D, No. 3, 1994, pp. 268-275.

*Primary Examiner*—George M. Dombroske
*Assistant Examiner*—Paul D. Amrozowicz
*Attorney, Agent, or Firm*—Burns, Doane, Swecker & Mathis, LLP

[57] ABSTRACT

The invention is directed to a method and apparatus for detecting a tire inflation pressure of a vehicle tire. The apparatus includes a device for producing an oscillating electric signal having a vibration frequency component of the vehicle tire. A wavelet transformer transforms the oscillating electric signal by a wavelet function into a wavelet coefficient. The wavelet function is provided on the basis of a mother wavelet function localized in time, scaled in response to a scale parameter, and shifted in response to a shift parameter indicative of a time localization. Then, an extracting device extracts a resonance frequency from the vibration frequency component of the vehicle tire on the basis of the wavelet coefficient, and an estimating device estimates the tire inflation pressure on the basis of the resonance frequency. The apparatus may further include a warning device for warning a decrease of the tire inflation pressure when the resonance frequency decreases to an extent that a difference between the resonance frequency and the reference frequency exceeds a predetermined frequency.

8 Claims, 6 Drawing Sheets

F I G. 1
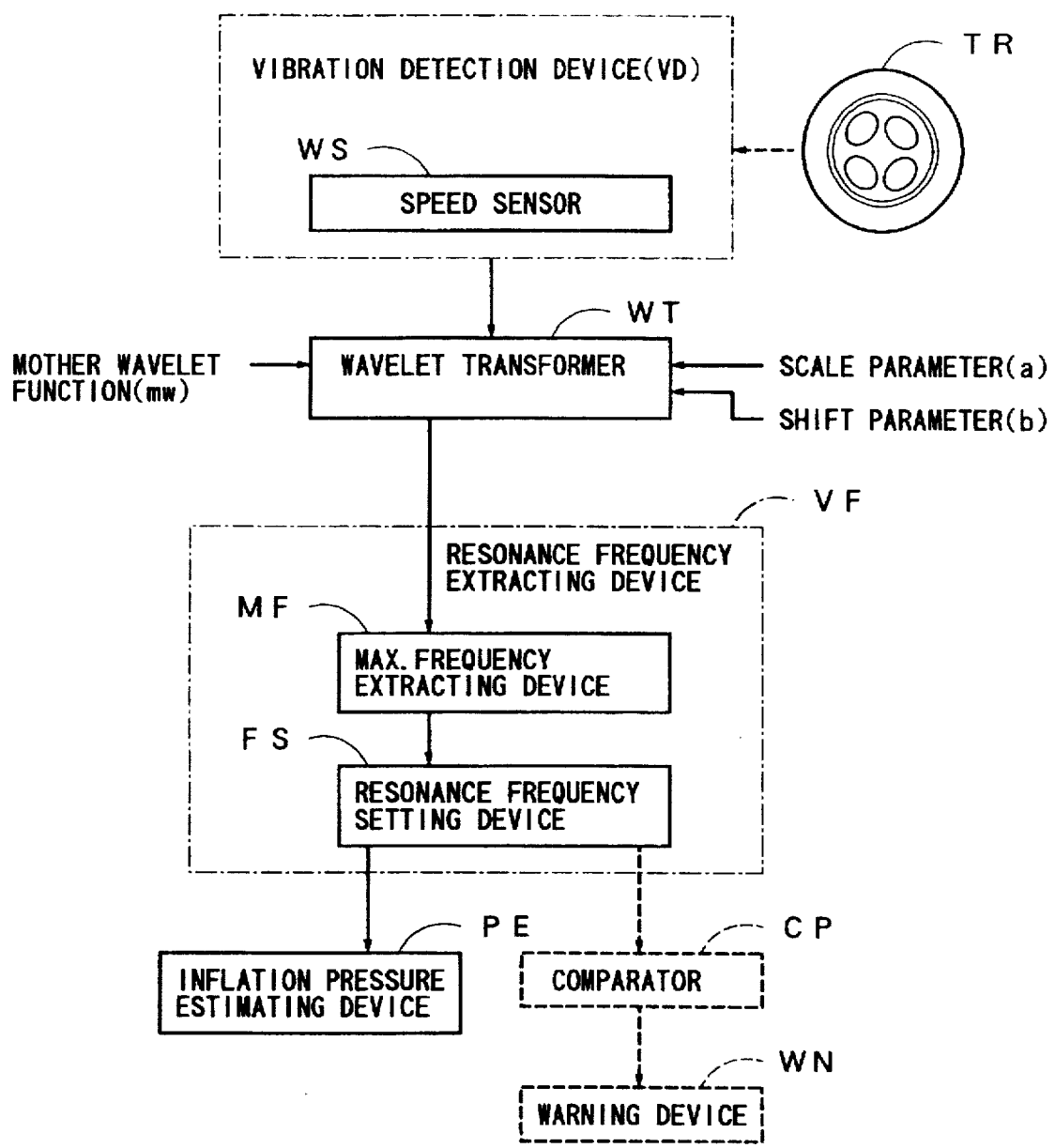

F I G. 8
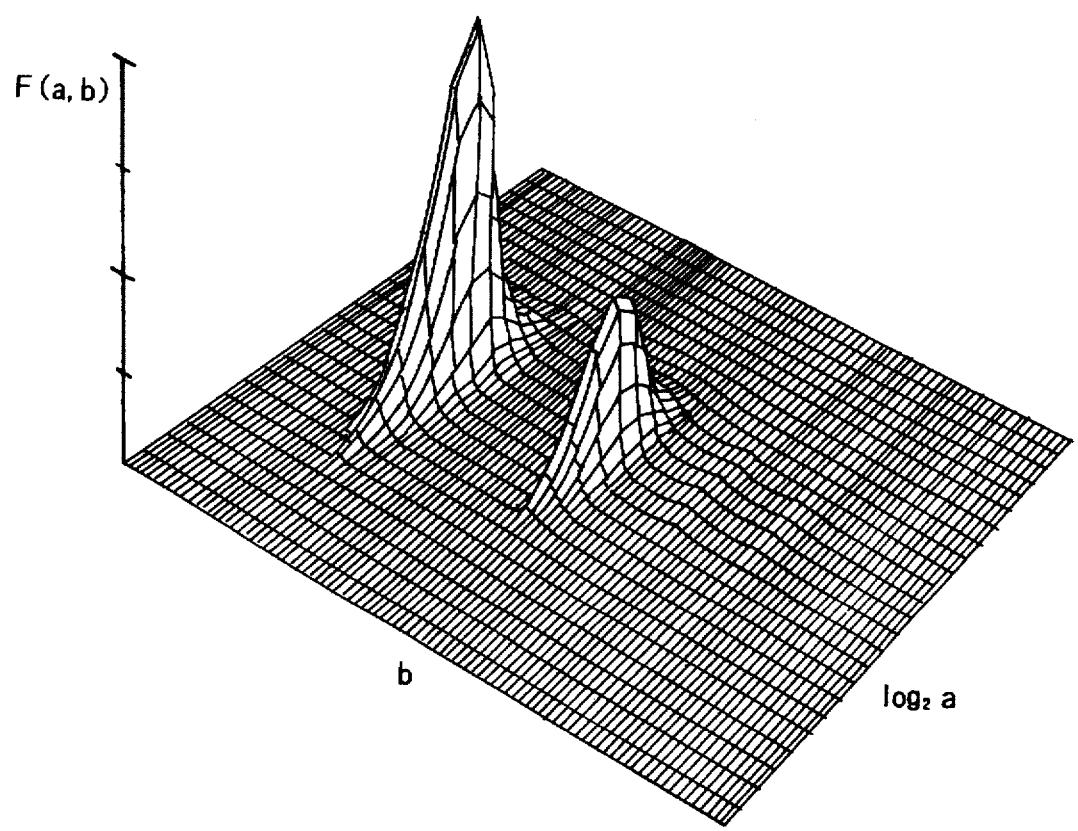

METHOD AND APPARATUS FOR DETECTING A TIRE INFLATION PRESSURE

BACKGROUND OF THE INVENTION

1. Field of the Invention

The present invention relates to a method and apparatus for detecting a tire inflation pressure, and more particularly to the method and apparatus using a wavelet function provided on the basis of a mother wavelet function which is localized in time, for use in an automotive vehicle.

2. Description of the Prior Arts

Various systems for detecting a tire inflation pressure have been known, including an apparatus for indirectly detecting the tire inflation pressure on the basis of a signal detected by a wheel speed sensor. In Japanese Patent Laid-open Publication No. 5-133831, for example, the apparatus for detecting the tire inflation pressure has been proposed so as to detect the tire inflation pressure indirectly, and improve the detecting accuracy. The apparatus comprises means for producing an output signal with a vibration frequency component of a tire, means for extracting a resonance frequency from the signal including the vibration frequency-component of the tire, and means for detecting the tire inflation pressure on the basis of the resonance frequency. As for an embodiment according to the above publication, it is described that frequency analytic operations (through "FFT") are made with respect to calculated wheel speeds, and a processing number of the operations (N) is counted, and also described that in the case where the FFT operations are made with respect to the wheel speeds of a vehicle actually running on a road, frequency characteristics will be random, in general. Then, it is stated that protrusions formed on the surface of the road are not uniform in shape and height, so that the frequency characteristics will be varied in dependence upon the wheel speeds. Accordingly, it is stated that the embodiment is provided for calculating an average of the results of the FFT operations.

However, according to the above-described tire inflation pressure detecting apparatus, the analysis is made on the basis of the FFT (Fast Fourier Transform) operation, so that it will be the one for analyzing the signals through an average of frequencies in a certain time period. Therefore, it is not always possible to extract the resonance frequency, nor it is possible to identify the time to be extracted. Accordingly, it may not be possible to obtain the resonance frequency properly by means of the analysis through the FFT operation. In order to obtain the resonance frequency constantly, it is necessary to always identify the frequency to be extracted therefrom.

In a field of analyzing signals, the Fourier transform has been utilized in many occasions. In order to divide or combine those signals, a wavelet transform is getting popular recently for use in various fields such as audio, display or the like, as disclosed in Japanese Patent Laid-open Publication No. 4-275685. It is known that the wavelet transform is a method for dividing an input signal into wavelets as its components, and re-configuring the original input signal as a linear coupling of the wavelets. The wavelet transform is effectively used for analyzing an unsteady state, such as state transition or the like, and has as its base a mother wavelet function, to which a scale transform and a shift transform are performed. The mother wavelet function is a square-integrable function which is localized in time, and the base of which may be selected freely as far as flexible admissible conditions can be met, although the base has to be the one to be bounded, or the one to be attenuated rapidly in a remote area. Furthermore, the mother wavelet function may be used effectively for identifying a position of a singular point, because it has various characteristics, such that the base is analogous, that the direct current component is not included, and that a dissector rate for analysis can be provided freely.

In the meantime, as for an oscillating electric signal with a vibration frequency component of a tire, a wheel speed and the like may be employed, because those signals have repeatable characteristics corresponding to the tire inflation pressure. Therefore, if a singular characteristic can be found by analyzing the output signal, it will be possible to detect a reduction of the tire inflation pressure, and yet estimate the value of the tire inflation pressure.

SUMMARY OF THE INVENTION

Accordingly, it is an object of the present invention to provide a method and apparatus for always detecting a tire inflation pressure accurately.

It is another object of the present invention to provide an apparatus for warning a decrease of a tire inflation pressure.

In accomplishing the above and other objects, a method is provided for detecting a tire inflation pressure of a vehicle tire. The method includes the steps of producing an oscillating electric signal having a vibration frequency component of the vehicle tire, and transforming the oscillating electric signal by a wavelet function into a wavelet coefficient. The wavelet function is provided on the basis of a mother wavelet function which is localized in time, scaled in response to a scale parameter, and shifted in response to a shift parameter indicative of a time localization. The method further includes the step of extracting a resonance frequency from the frequencies having the vibration frequency component of the vehicle tire on the basis of the wavelet coefficient, and the step of estimating the tire inflation pressure on the basis of the resonance frequency. As for wavelet functions, Gabor function, Mexican hat function, French hat function, Haar function, or the like may be used.

According to the method for detecting the tire inflation pressure, the step of producing the oscillating electric signal may include the step of detecting a rotational speed of the vehicle tire to output an electric signal which corresponds to the rotational speed and which serves as the oscillating electric signal. And, an acceleration of unsprung portion of the vehicle, a varying velocity or acceleration of a signal detected by a load sensor, a height sensor or the like may be employed as the oscillating electric signal having the vibration frequency component of the tire.

Also provided is an apparatus for detecting a tire inflation pressure of a vehicle tire. The apparatus comprises means for producing an oscillating electric signal having a vibration frequency component of the vehicle tire, means for transforming the oscillating electric signal by a wavelet function into a wavelet coefficient. The wavelet function is provided on the basis of a mother wavelet function which is localized in time, scaled in response to a scale parameter, and shifted in response to a shift parameter indicative of a time localization. The apparatus further comprises means for extracting a resonance frequency from the vibration frequency component of the vehicle tire on the basis of the wavelet coefficient, and means for estimating the tire inflation pressure on the basis of the resonance frequency. The means for producing the oscillating electric signal may include a rotational speed sensor for detecting a rotational speed of the vehicle tire to output an electric signal which corresponds to the rotational speed, to the means for transforming the oscillating electric signal into the wavelet coefficient.

The apparatus may further comprise means for comparing the resonance frequency with a predetermined reference frequency, and means for warning a decrease of the resonance frequency when the comparing means determines that a difference between the resonance frequency and the reference frequency exceeds a predetermined value.

BRIEF DESCRIPTION OF THE DRAWINGS

The above stated objects and following description will become readily apparent with reference to the accompanying drawings, wherein like reference numerals denote like elements, and in which:

FIG. 1 is a schematic block diagram showing a basic construction of a tire inflation pressure detection system according to the present invention;

FIG. 8 is a diagram of an example of a wavelet coefficient shown by three-dimension according to the present invention.

DESCRIPTION OF THE PREFERRED EMBODIMENTS

Referring to FIG. 1, there is schematically illustrated a tire inflation pressure detection system for use in an automotive vehicle according to an embodiment of the present invention. A vibration detection device (VD) is provided for producing an oscillating electric signal having a vibration frequency component of a vehicle tire (TR). A wavelet transformer (WT) is provided for transforming the oscillating electric signal by a wavelet function into a wavelet coefficient F(a, b). The wavelet function is provided on the basis of a mother wavelet function (mw), scaled in response to a scale parameter (a), and shifted in response to a shift parameter (b) which indicates a time localization. A resonance frequency extracting device (VF) is provided for extracting a resonance frequency from the vibration frequency component of the vehicle tire (TR), and an inflation pressure estimating device (PE) is provided for estimating the tire inflation pressure on the basis of the resonance frequency. The vibration detection device (VD) may include a rotational speed sensor (WS) which detects a rotational speed of the vehicle tire (TR) to output an electric signal which corresponds to the rotational speed, to the wavelet transformer (WT). Furthermore, a comparator (CP) may be provided for comparing the resonance frequency with a predetermined reference frequency, and a warning device (WN) may be provided for warning a decrease of the resonance frequency when the comparator (CP) determines that a difference between the resonance frequency and the reference frequency exceeds a predetermined value.

Figure 2:
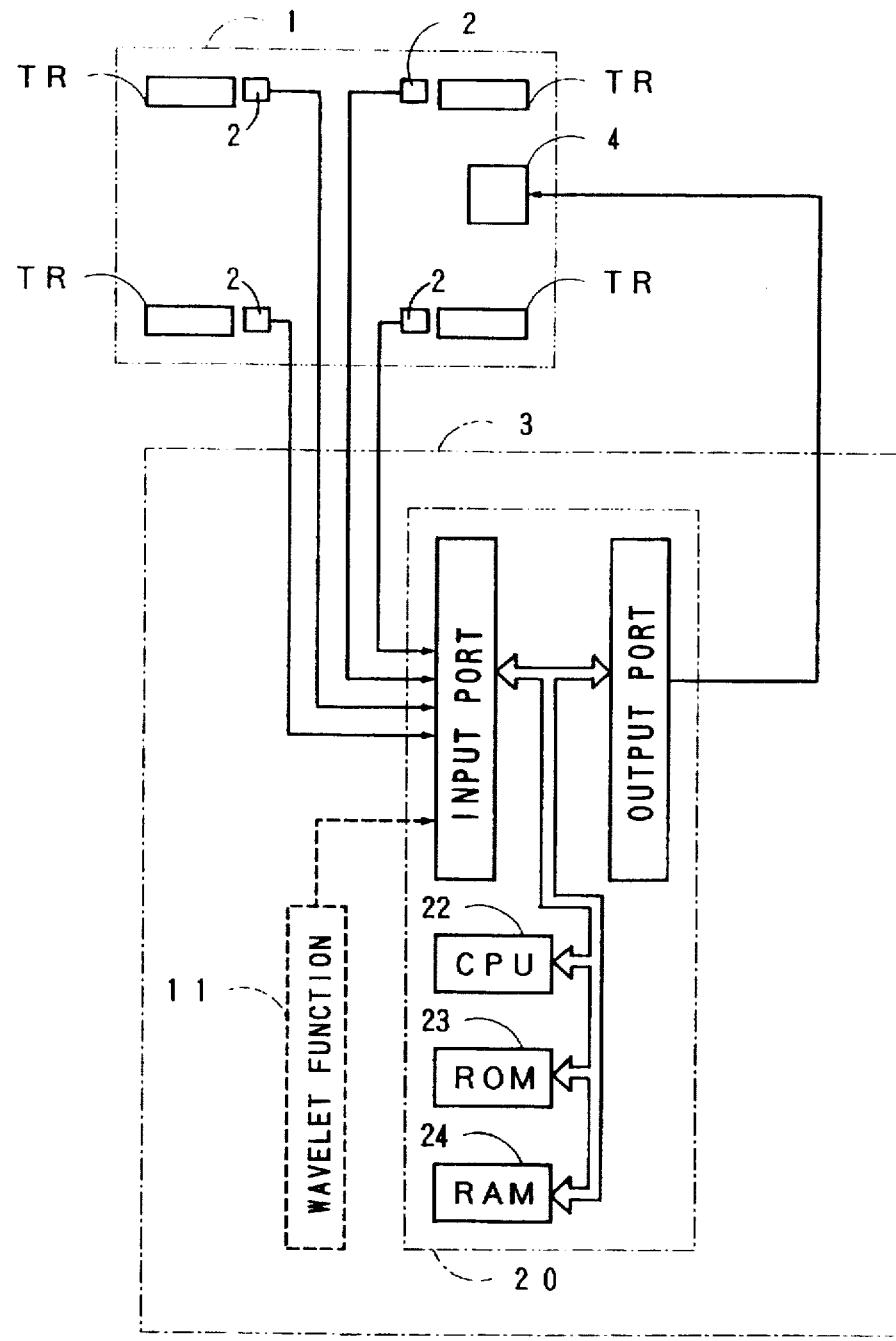
FIG. 2 is a schematic drawing of overall construction of a tire inflation pressure detection system according to an embodiment of the present invention.
Figure 4:
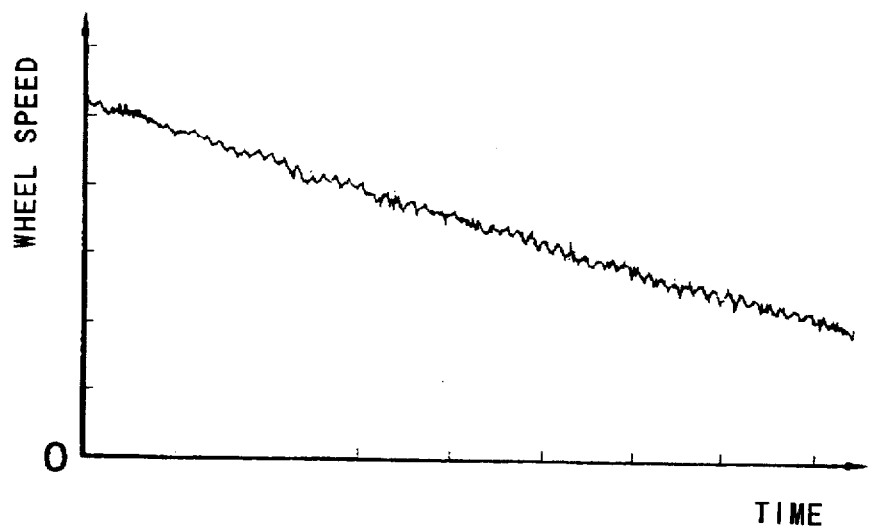
FIG. 4 is a diagram showing an example of variation of a rotational speed of a tire detected by a wheel speed sensor according to an embodiment of the present invention.
Figure 5:
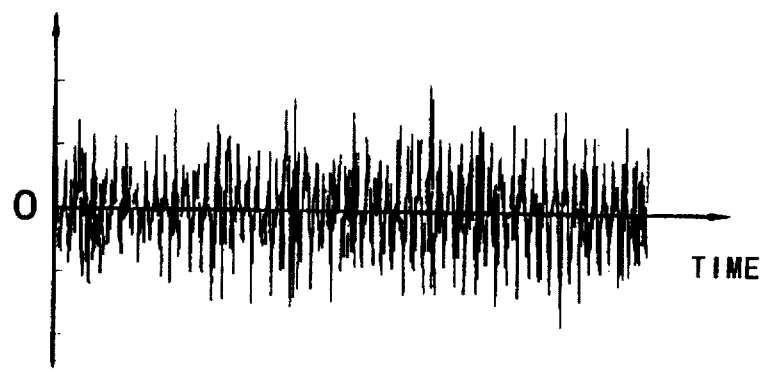
FIG. 5 is a diagram showing an example of vibration of a tire speed according to an embodiment of the present invention.

More specifically, the details of the embodiment disclosed in FIG. 1 are illustrated in FIG. 2. In the vicinity of tires (TR) of a vehicle (1), provided are wheel speed sensors (2) which serve as the rotational speed sensor (WS) as shown in FIG. 1. Each of the wheel speed sensors (2) in the present embodiment is a well known sensor of electromagnetic induction type which comprises a pick-up having a coil wound around a permanent magnet and a rotor having an outer peripheral end thereof provided with teeth, and which are adapted to output a digital signal in response to a rotational speed of each wheel. Other types of sensor may be used, instead of the above-described sensor. FIG. 4 illustrates an example of variation of the wheel speed, which has a vibration component as shown in FIG. 5. The wheel speed sensors (2) are connected to an electronic control unit (3) which has a microcomputer (20), into which output signals of the wheel speed sensors (2) are fed, and which is adapted to determine whether the inflation pressure of the tire (TR) is decreased, and adapted to drive a warning device (4) in accordance with the result of determination.

Figure 3:
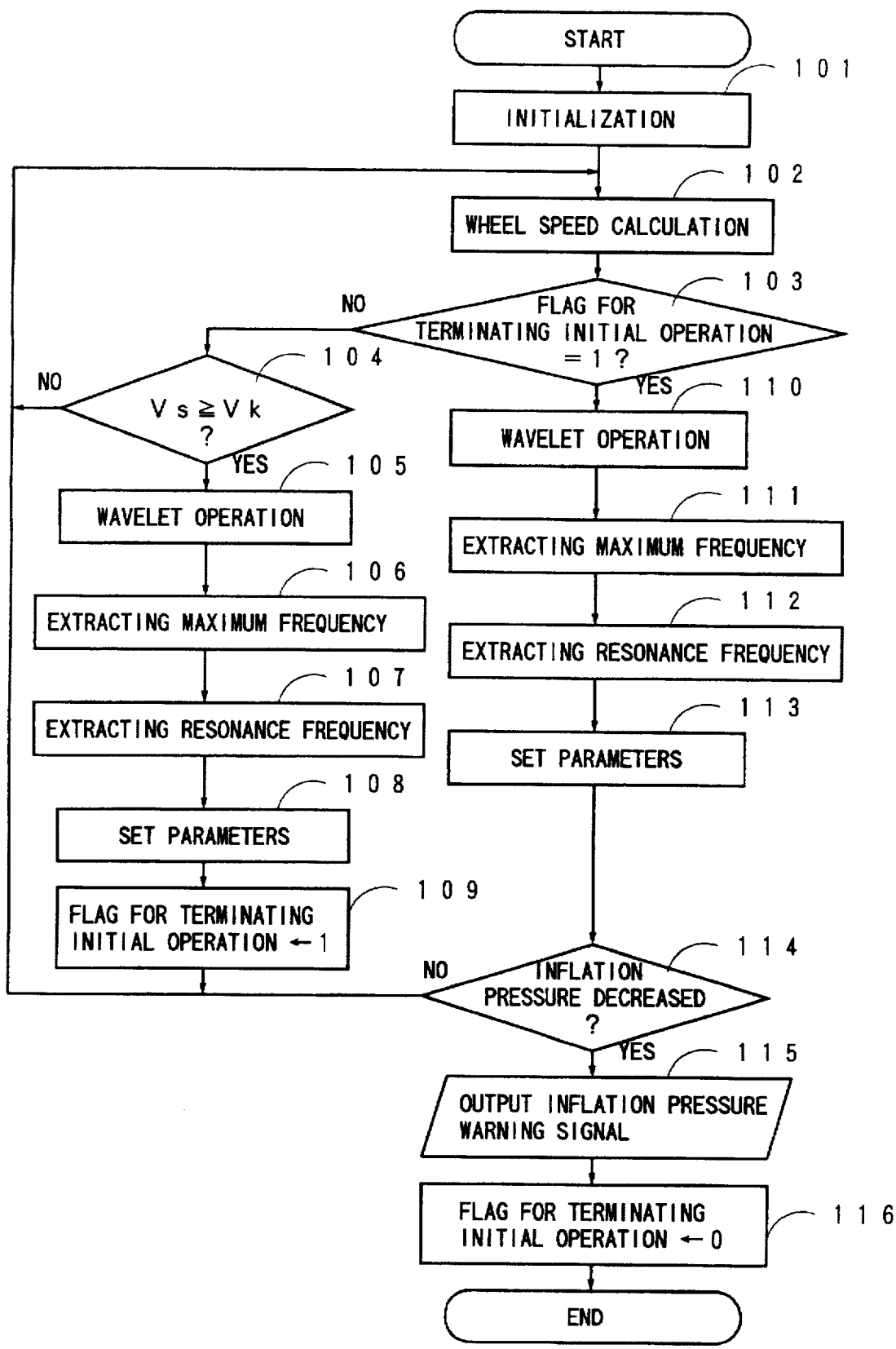
FIG. 3 is a flowchart showing operation for warning with respect to a tire inflation pressure according to an embodiment of the present invention.

The microcomputer (20) is constituted in such a conventional manner that an input port (21), a central processing unit or CPU (22), a read only memory or ROM (23), a random access memory or RAM (24), an output port (25) and etc. are connected to each other through a common bus. Output signals of the wheel speed sensors (2) are fed into the input port (21), and computed at the CPU (22), and then output from the output port (25) to the warning device (4). The microcomputer (20) includes a wavelet function (11), e.g., Gabor function. In the microcomputer (20), the ROM (23) memorizes a program corresponding to a flowchart as shown in FIG. 3, the CPU (22) executes the program while an ignition switch (not shown) is closed, and the RAM (24) temporarily memorizes variable data needed to execute the program.

The definition of the wavelet transform used in the present invention will be explained hereinafter, as well as other terminologies used in the present application. First of all, the base of the wavelet transform is called a mother wavelet function h(t), which is a square-integrable transform function, and whose norm has been normalized, and which is localized in a time domain, at least. This mother wavelet function h(t) may be defined as the one to satisfy the following formula (1), which is called an admissible condition, and which indicates that a direct current component (or, mean value) of the signal is zero.

$$\hat{h}(0) = \frac{1}{\sqrt{2\pi}} \int h(t)dt = 0 \qquad (1)$$

Then, the wavelet function is provided by scaling the mother wavelet function by "a" times, and then translating, or shifting its original point by "b", in accordance with the following formula (2):

$$h_{a,b}(t) \equiv \frac{1}{\sqrt{a}} h\left(\frac{t-b}{a}\right) \qquad (2)$$

Therefore, supposing that a function to be analyzed is f(t), the wavelet transform is defined as shown in the following formula (3):

$$F(a,b) \equiv <h_{a,b}(t), f(t)> \quad (3)$$

$$\equiv \int h^*_{a,b}(t) f(t) dt$$

where F(a,b) indicates a wavelet coefficient, < > indicates an inner product, and * indicates a complex conjugate.

The wavelet function used for analyzing something is called an analyzing wavelet (mother wavelet function), for which the Gabor function or the like is employed. For example, Morlet's wavelet, which is one of the Gabor functions, and which is defined in the following formula (4), is known as the analyzing wavelet suitable for analyzing a signal having such a singularity that a differential coefficient is discontinuous.

$$h(t) = \exp(-j\omega_0 t) \exp\left(\frac{-t^2}{2}\right), \omega_0 = 5-6 \quad (4)$$

In the microcomputer (20), the decrease of the inflation pressure of the tire (TR) is determined as described later, and the result of the determination is output to a warning device (4). This warning device (4) is arranged such that a lamp (not shown) is lightened, when it is determined that the inflation pressure of the tire (TR) has decreased. Or, the warning device (4) may be arranged such that the decrease of the tire inflation pressure is notified through a visible indication and/or audible indication. The program routine executed by the electronic control unit (3) for detecting the inflation pressure of the tire (TR) will now be described with reference to FIG. 3. The program routine corresponding to the flowchart as shown in FIG. 3 starts when the ignition switch (not shown) is turned on, and provides for initialization of the system at Step 101 to clear various data. When the vehicle starts to move, the program proceeds to Step 102, where each of the wheel speed sensors (2) outputs the digital signal in response to the rotational speed of the tire (TR), which signal serves as the oscillating electric signal having the vibration frequency component of the tire (TR) to be used for the estimation of the tire inflation pressure.

Next, the program proceeds to Step 103, where it is determined whether an initial operation has been made or not. That is, it is determined at Step 103 whether a flag for terminating the initial operation has been set (=1) or not at Step 109, which will be described later. If it is determined that the flag has not been set, the program proceeds to Step 104 where it is further determined whether a vehicle speed (Vs) has been increased more than a predetermined speed (Vk) or not. If it has not reached to the predetermined speed (Vk), the program returns to Step 102. In the case where the vehicle speed (Vs) is equal to or more than the predetermined speed (Vk), the program proceeds to the Steps following the Step 105 to perform the initial operation. The vehicle speed (Vs) is estimated on the basis of the output signal of the wheel speed sensor (2) in accordance with a conventional manner.

Figure 6:
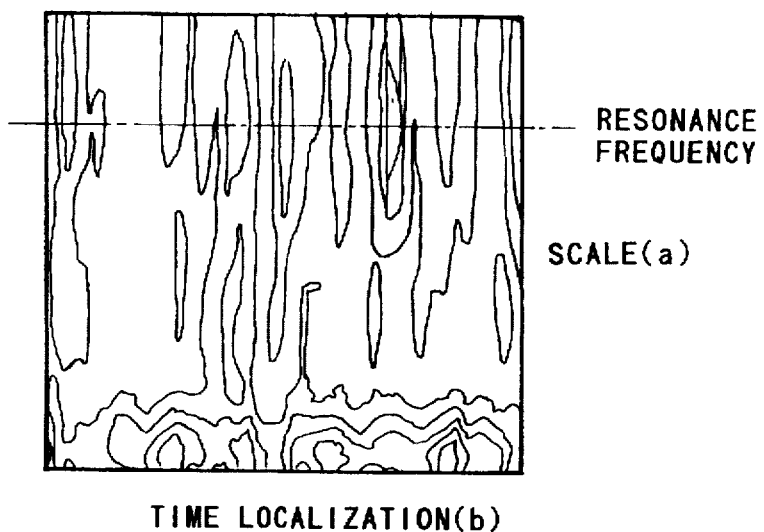
FIG. 6 is a diagram showing an example of a condition of a wavelet coefficient for use in extracting a resonance frequency according to an embodiment of the present invention.

At Step 105, the oscillating electric signal output from the wheel speed sensor (2) is input into the microcomputer (20) in the form of the aforementioned function f(t) to be analyzed, for example. In the microcomputer (20), the wavelet transform is performed in accordance with a shift parameter "b" (hereinafter, referred to as a time localization (b)), and a frequency scale parameter "a" (hereinafter, referred to as a scale (a)), so that a wavelet coefficient F (a, b) is computed. That is, the function f(t) is integrated by convolution of the mother wavelet function. FIG. 6 illustrates a condition of the wavelet coefficient F(a, b) according to the wavelet analysis. The magnitude of the wavelet coefficient F(a, b) is indicated by a contour map as shown in FIG. 6. The condition of the wavelet coefficient F(a, b) may be illustrated by three-dimension as shown in FIG. 8 which does not directly correspond to FIG. 6. In each figure, the scale parameter (a) is indicated by logarithmic value. As for the wavelet functions, Gabor function, Mexican hat function, French hat function, Haar function, or the like may be used.

Then, at Step 106, a maximum frequency is extracted every first predetermined time period in accordance with the condition of the wavelet coefficient F(a, b). Among the maximum frequencies extracted in a second predetermined time period, the most frequent value, i.e., most frequently extracted maximum frequency is selected to provide the resonance frequency at Step 107. Thereafter, the program proceeds to Step 108 where various parameters for estimating the tire inflation pressure are set on the basis of the resonance frequency. Then, after the flag for terminating the initial operation is set (=1) at Step 109, the program returns to Step 102.

When it is determined at Step 103 that the flag has been set, the wavelet operation is executed at Step 110, as done at Step 105, and the same operations are executed at Steps 111, 112 and 113 as those executed at Steps 106, 107 and 108. Then, the program proceeds to Step 114 where it is determined whether the inflation pressure of the tire (TR) has been decreased or not. Specifically, the resonance frequency extracted at Step 112 is compared with the resonance frequency obtained through the initial operation executed at Step 107, for example. When a difference between the resonance frequency obtained at Step 112 and the resonance frequency obtained at Step 107 has become less than the predetermined frequency (e.g., 4 Hz), it is determined that the inflation pressure of the tire (TR) has been decreased. Unless it is determined that the inflation pressure of the tire (TR) has been decreased, therefore, the program returns to Step 102 to repeat the Steps 102–113. If it is determined at Step 114 that the tire inflation pressure has been decreased, the program proceeds to Step 115 where a inflation pressure warning signal is output to the warning device 4, which will lighten a lamp (not shown), for example, to indicate the decrease of the tire inflation pressure.

After the warning device 4 is activated, the flag for terminating the initial operation is reset (=0) at Step 116, and the program ends. Therefore, in the case where it was determined that the inflation pressure of the tire (TR) was decreased so that the warning signal was output in the previous cycle, the initial operation is not executed in the present cycle, so that the parameters are set in accordance with the resonance frequency extracted in the previous cycle. As a result, in the case where the ignition switch was turned off when the tire inflation pressure was decreased, and where the ignition switch is turned on again, the initial operation is executed again without using the result of the previous initial operation, so that an erroneous determination about the inflation pressure of the tire (TR) can be avoided.

At Step 110, it is possible to simplify the operation by means of a Butterwirth band-pass filter, thereby to reduce the operations to be executed in the microcomputer (20) including those operations at Steps 111–114. For example, if the resonance frequency extracted in the initial operation is 40 Hz, the band-pass filter may be set as 42/40/38/36/34 Hz. Then, with respect to the resonance frequency of 40 Hz, if the resonance frequency extracted at the later operation is decreased by 4 Hz to become 36 Hz, it can be determined that the inflation pressure of the tire (TR) has been decreased to output the warning signal to the warning device (4). Accordingly, the above-described apparatus can be easily adapted even when the tire is replaced, to serve as a general purpose tire inflation pressure detection apparatus.

Figure 7:
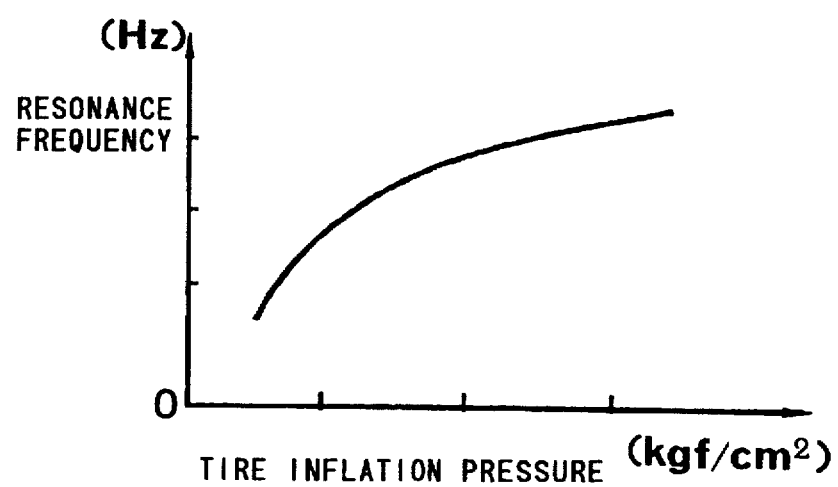
FIG. 7 is a diagram showing an example of a map indicative of a relationship between a resonance frequency and a tire inflation pressure according to an embodiment of the present invention.

As described above, when it is determined that the tire inflation pressure has been decreased, the warning is made according to the above-described embodiment. However, it may be so arranged that the tire inflation pressure is directly indicated. Since the tire inflation pressure can be estimated in response to the resonance frequency, on the basis of a map as shown in FIG. 7 for example, the estimated value may be indicated directly, in stead of executing Step 114. Further, without employing the map, the tire inflation pressure can be calculated by the following formula (5):

$$f = a\sqrt{\frac{K}{m}} \quad (5)$$

where "f" indicates the resonance frequency (Hz), "m" indicates a mass (kg), "K" indicates a spring constant (N/m), and "a" indicates a constant value. And, an acceleration of unsprung portion of the vehicle, a varying velocity or acceleration of a signal detected by a load sensor, a height sensor or the like may be employed as the oscillating electric signal having the vibration frequency component of the tire (TR) according to the above embodiment, while the wheel speed is employed according to the above-described embodiment.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for detecting a tire inflation pressure of a vehicle tire, comprising the steps of:
   producing an oscillating electric signal having a vibration frequency component of said vehicle tire;
   transforming the oscillating electric signal by a wavelet function into a wavelet coefficient, said wavelet function being provided on the basis of a mother wavelet function localized in time, scaled in response to a scale parameter, and shifted in response to a shift parameter indicative of a time localization;
   extracting a resonance frequency from the vibration frequency component of said vehicle tire on the basis of the wavelet coefficient, the step of extracting the resonance frequency including extracting a maximum frequency from the vibration frequency components of said vehicle tire obtained every first predetermined time period on the basis of the wavelet coefficient, and selecting a most frequent value of the maximum frequencies extracted in a second predetermined time period thereby to set the most frequent value for the resonance frequency; and
   estimating the tire inflation pressure on the basis of the resonance frequency.

2. The method as defined in claim 1, wherein the step of producing the oscillating electric signal includes the step of detecting a rotational speed of said vehicle tire to output an electric signal which corresponds to the rotational speed and which serves as the oscillating electric signal.

3. The method as defined in claim 1, further comprising the step of comparing the resonance frequency with a predetermined reference frequency, and the step of warning of a decrease of the tire inflation pressure when the resonance frequency decreases to an extent that a difference between the resonance frequency and the reference frequency exceeds a predetermined frequency.

4. An apparatus for detecting a tire inflation pressure of a vehicle tire, comprising:
   means for producing an oscillating electric signal having a vibration frequency component of said vehicle tire;
   means for transforming the oscillating electric signal by a wavelet function into a wavelet coefficient, said wavelet function being provided on the basis of a mother wavelet function localized in time, scaled in response to a scale parameter, and shifted in response to a shift parameter indicative of a time localization;
   means for extracting a resonance frequency from the vibration frequency component of said vehicle tire on the basis of the wavelet coefficient, said means for extracting the resonance frequency including means for extracting a maximum frequency from the vibration frequency components of said vehicle tire obtained every first predetermined time period on the basis of the wavelet coefficient obtained by said means for transforming the oscillating electric signal into the wavelet coefficient, and means for selecting a most frequent value of the maximum frequencies extracted in a second predetermined time period thereby to set the most frequent value for the resonance frequency; and
   means for estimating the tire inflation pressure on the basis of the resonance frequency.

5. The apparatus as defined in claim 4, wherein said means for producing the oscillating electric signal includes a rotational speed sensor for detecting a rotational speed of said vehicle tire to output an electric signal corresponding to the rotational speed to said means for transforming the oscillating electric signal into the wavelet coefficient.

6. The apparatus as defined in claim 4, further comprising means for comparing the resonance frequency with a predetermined reference frequency, and means for warning of a decrease of the tire inflation pressure when said comparing means determines that the resonance frequency decreases to an extent that a difference between the resonance frequency and the reference frequency exceeds a predetermined frequency.

7. The method as defined in claim 1, wherein said step of extracting a resonance frequency involves extracting an initial resonance frequency and extracting a subsequent resonance frequency, and including comparing the initial resonance frequency to the subsequent resonance frequency.

8. The apparatus as defined in claim 4, wherein said means for extracting includes means for extracting an initial resonance frequency and a subsequent resonance frequency, and including means for comparing the initial resonance frequency with the subsequent resonance frequency.

* * * * *